US010833954B2

United States Patent
Carroll et al.

(10) Patent No.: US 10,833,954 B2
(45) Date of Patent: Nov. 10, 2020

(54) EXTRACTING DEPENDENCIES BETWEEN NETWORK ASSETS USING DEEP LEARNING

(71) Applicant: Battelle Memorial Institute, Richland, WA (US)

(72) Inventors: Thomas E. Carroll, Richland, WA (US); Satish Chikkagoudar, Richland, WA (US); Thomas W. Edgar, Richland, WA (US); Kiri J. Oler, Tacoma, WA (US); Kristine M. Arthur, West Lafayette, IN (US); Daniel M. Johnson, Kennewick, WA (US); Lars J. Kangas, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1641 days.

(21) Appl. No.: 14/548,159

(22) Filed: Nov. 19, 2014

(65) Prior Publication Data

US 2016/0142266 A1   May 19, 2016

(51) Int. Cl.
*G06F 15/08* (2006.01)
*H04L 12/24* (2006.01)
*H04L 12/26* (2006.01)

(52) U.S. Cl.
CPC .............. *H04L 41/16* (2013.01); *H04L 41/14* (2013.01); *H04L 43/026* (2013.01)

(58) Field of Classification Search
CPC ........ H04L 41/14; H04L 41/16; H04L 43/026
See application file for complete search history.

(56) References Cited

U.S. PATENT DOCUMENTS

| 5,103,488 A | * | 4/1992 | Gemello | ................... G06K 9/66 |
| | | | | 348/26 |
| 7,346,922 B2 | * | 3/2008 | Miliefsky | ........... H04L 63/0272 |
| | | | | 726/11 |

(Continued)

OTHER PUBLICATIONS

Chaudhary et al., "Flow Classification Using Clustering and Association Rule Mining," *IEEE Int'l Workshop on Computer Aided Modeling Analysis and Design of Communication Links and Networks*, pp. 76-80 (Dec. 2010).

(Continued)

*Primary Examiner* — Luis A Sitiriche
(74) *Attorney, Agent, or Firm* — Klarquist Sparkman, LLP

(57) ABSTRACT

A network analysis tool receives network flow information and uses deep learning—machine learning that models high-level abstractions in the network flow information—to identify dependencies between network assets. Based on the identified dependencies, the network analysis tool can discover functional relationships between network assets. For example, a network analysis tool receives network flow information, identifies dependencies between multiple network assets based on evaluation of the network flow information, and outputs results of the identification of the dependencies. When evaluating the network flow information, the network analysis tool can pre-process the network flow information to produce input vectors, use deep learning to extract patterns in the input vectors, and then determine dependencies based on the extracted patterns. The network analysis tool can repeat this process so as to update an assessment of the dependencies between network assets on a near real-time basis.

18 Claims, 6 Drawing Sheets

(56) References Cited

U.S. PATENT DOCUMENTS

| | | | |
|---|---|---|---|
| 2003/0023571 A1* | 1/2003 | Barnhill | G06K 9/6256 706/16 |
| 2007/0079073 A1* | 4/2007 | Rosenbluth | G06F 9/30047 711/134 |
| 2007/0250461 A1* | 10/2007 | Sabe | G06F 15/18 706/12 |
| 2008/0010225 A1* | 1/2008 | Gonsalves | G06N 7/005 706/11 |
| 2010/0046377 A1* | 2/2010 | Ryan | H04L 41/0681 370/241 |
| 2013/0246322 A1* | 9/2013 | De Sousa Webber | G06N 3/0454 706/18 |
| 2013/0246606 A1 | 9/2013 | Branch et al. | |
| 2015/0195136 A1* | 7/2015 | Mermoud | H04L 41/5025 706/12 |
| 2015/0379422 A1* | 12/2015 | Chandler | G06N 99/005 706/12 |
| 2016/0156652 A1* | 6/2016 | Paffenroth | H04L 63/1425 726/23 |

OTHER PUBLICATIONS

International Search Report and Written Opinion dated Mar. 2, 2016, from International Patent Application No. PCT/US2015/060662, 9 pp.

Li et al., "A Supervised Machine Learning Approach to Classify Host Roles on Line Using sFlow," *ACM Workshop on High Performance and Programmable Networking*, pp. 53-60 (Dec. 2013).

Marshall, "CANDID: Classifying Assets in Networks by Determining Importance and Dependencies," Ph.D. Dissertation, University of California, Berkeley, 93 pp. (May 2013).

Peddycord et al., "On the Accurate Identification of Network Service Dependencies in Distributed Systems," *Large Installation System Administration Conf.*, pp. 181-194 (Dec. 2012).

Kiemele et al., Basic Statistics—Tools for Continuous Improvement, Fourth Edition, Chapter 12, "Case Studies," 131 pp. (Jun. 1997).

Aguilera et al., "Performance Debugging for Distributed Systems of Black Boxes," *Proc. ACM Symp. on Operating System Principes*, vol. 37, Issue 5, pp. 74-89 (Dec. 2003).

Bagchi et al., "Dependency Analysis in Distributed Systems Using Fault Injection: Application to Problem Determination in an e-Commerce Environment," *Proc. of the 12$^{th}$ Int'l Workshop on Distributed Systems: Operations and Management*, 14 pp. (Oct. 2001).

Bahl et al., "Discovering Dependencies for Network Management," *Proc. of the 5$^{th}$ Workshop on Hot Topics in Networks*, pp. 97-102 (Nov. 2006).

Bahl et al., "Towards Highly Reliable Enterprise Network Services via Inference of Multi-Level Dependencies," *Proc. ACM SIGCOMM Conf. on Data Communications*, pp. 13-24 (Aug. 2007).

Barham et al., "Using Magpie for Request Extraction and Workload Modelling," *Proc. of the 6$^{th}$ Symp. on Operating Systems Design and Implementation*, pp. 259-272 (Dec. 2004).

Black et al., "Ethernet Topology Discovery Without Network Assistance," *Proc. of the 12$^{th}$ IEEE Int'l Conf. on Network Protocols*, pp. 328-339 (Oct. 2004).

Brown et al., "An Active Approach to Characterizing Dynamic Dependencies for Problem Determination in a Distributed Environment," *Proc. of the IEEE/IFIP Int'l Symp. on Integrated Network Management*, pp. 377-390 (May 2001).

Carroll et al., "Security Informatics Research Challenges for Mitigating Cyber Friendly Fire," *Security Informatics*, vol. 3, 14 pp. (Sep. 2014).

Chen et al., "Automating Network Application Dependency Discovery: Experiences, Limitations, and New Solutions," *Proc. of the 8$^{th}$ USENIX Conf. on Operating Systems Design and Implementation*, pp. 117-130 (Dec. 2008).

Chen et al., "Path-Based Failure and Evolution Management," *Proc. of the 1$^{st}$ Symp. on Networked Systems Design and Implementation*, 14 pp. (Mar. 2004).

Claise, "Cisco Systems NetFlow Service Export Version 9," *IETF*, RFC 3954, 33 pp. (Oct. 2004).

Claise et al., "Information Model for IP Flow Information Export (IPFIX)," *IETF*, RFC 7012, 24 pp. (Sep. 2013).

Claise et al., "Specification of the IP Flow Information Export (IPFIX) Protocol for the Exchange of Flow Information," *IETF*, RFC 7011, 76 pp. (Sep. 2013).

D'Antonio et al., "Flow Selection Techniques," *IETF*, RFC 7014, 33 pp. (Sep. 2013).

Dechouniotis et al., "Dependency Detection Using a Fuzzy Engine," *Lecture Notes in Computer Science*, vol. 4785, pp. 110-121 (Oct. 2007).

Dechouniotis et al., "Dependency Detection Using a Fuzzy Inference Engine," *IEEE DSOM*, 12 pp. (2007).

Dunagan et al., "FUSE: Lightweight Guaranteed Distributed Failure Notification," *Proc. of the 6$^{th}$ Symp. on Operating Systems Design and Implementation*, pp. 151-166 (Dec. 2004).

Fonseca et al., "X-Trace: A Pervasive Network Tracing Framework," *Proc. of the 4$^{th}$ USENIX Symp. on Networked Systems Design and Implementation*, pp. 271-284 (Apr. 2007).

HoneProject, HoneProject homepage, downloaded from World Wide Web, 1 p., (accessed on Sep. 2, 2012).

Kandula et al., "What's Going on? Learning Communication Rules in Edge Networks," *Proc. of the ACM Conf. on Data Communications*, pp. 87-98 (Aug. 2008).

Kar et al., "Managing Application Services over Service Provider Networks: Architecture and Dependency Analysis," *Proc. IEEE/IFIP Network Operations and Management Symp.*, pp. 61-74 (Apr. 2000).

Keller et al., "Classification and Computation of Dependencies for Distributed Management," *Proc. of the 5$^{th}$ IEEE Symp. on Computers and Communications*, pp. 78-83 (Jul. 2000).

Kertzner et al., "Process Control System Security Technical Risk Assessment Methodology & Technical Implementation," Institute for Information Infrastructure Protection, Research Report No. 13, 47 pp. (Mar. 2008).

Lowekamp et al., "Topology Discovery for Large Ethernet Networks," *Proc. of Conf. on Applications, Technologies, Architectures, and Protocols for Computer Communications*, pp. 237-248 (Aug. 2001).

Natarajan et al., "NSDMiner: Automated Discovery of Network Service Dependencies," *Proc. of IEEE Int'l Conf. on Computer Communications*, pp. 2507-2515 (Mar. 2012).

North American Electric Reliability Corporation, "Security Guideline for the Electricity Sector: Identifying Critical Assets," 18 pp. (Sep. 2009).

Pacific Northwest National Laboratory, "DSOM: Decision Support for Operations & Maintenance," downloaded from World Wide Web, 21 pp. (document marked Apr. 2013).

Popa et al., "Macroscope: End-Point Approach to Networked Application Dependency Discovery," *Proc. of the 5$^{th}$ Int'l Conf. on Emerging Experiments and Technologies*, pp. 229-240 (Dec. 2009).

Proakis et al., *Digital Signal Processing—Principles, Algorithms, and Applications*, Chapter 4, "Frequency Analysis of Signals and Systems," and Chapter 11, "Linear Prediction and Optimum Linear Filters," pp. 230-393 and 852-895 (1996).

Rajahalme et al., "IPv6 Flow Label Specification," *IETF*, RFC 3697, 9 pp. (Mar. 2004).

Reynolds et al., "WAP5: Black-Box Performance Debugging for Wide-Area Systems," *Proc. of the 15$^{th}$ Int'l Conf. on World Wide Web*, pp. 347-356 (May 2006).

Trammell et al., "Bidirectional Flow Export Using IP Flow Information Export (IPFIX)," *IETF*, RFC 5103, 24 pp. (Jan. 2008).

Trammell et al., "Flow Aggregation for the IP Flow Information Export Protocol," *IETF*, RFC 7015, 49 pp. (Sep. 2013).

Trammell et al., "Guidelines for Authors and Reviewers of IP Flow Information Export (IPFIX) Information Elements," *IETF*, RFC 7013, 32 pp. (Sep. 2013).

\* cited by examiner

300

FIG. 6b (example of 620)

EXTRACTING DEPENDENCIES BETWEEN NETWORK ASSETS USING DEEP LEARNING

STATEMENT AS TO RIGHTS TO INVENTIONS MADE UNDER FEDERALLY-SPONSORED RESEARCH AND DEVELOPMENT

This invention was made with government support under Contract DE DE-AC05-76RL01830, awarded by the U.S. Department of Energy. The government has certain rights in the invention.

BACKGROUND

A network node in a computer network can originate, route, or receive data. A service, application or other software (generally, a service) running on a network node may depend on functionality provided by another service running at another network node. The other service may, in turn, depend on functionality provided by a third service running at a third network node, fourth service running at a fourth node, and so on.

Knowledge of dependencies between network assets (e.g., network nodes, services) in a computer network can be important when assessing damage to the network, planning extensions to the network, planning how to recover from a disaster, or otherwise evaluating the current or planned behavior of the network. Knowledge of dependencies can also help assess criticality, which is a measure of the business importance of a network asset. Information technology personnel are often unaware of dependencies between network assets, however, especially in a large network. Further complicating their jobs, in many cases, a computer network dynamically changes as network assets are added to the network or removed from the network. The dynamic nature of computer networks is evinced, for example, in cloud computing networks that scale to meet demands with "limitless" resources, in networks of consumer devices (e.g., the so-called Internet of Things), and in enterprise networks in which employees can add their own devices (e.g., according to so-called Bring Your Own Device or Bring Your Own Technology policies). In such computer networks, a large number of network assets may be characterized by spatial transiency, temporal transiency and ephemeral lifetimes.

According to some approaches to identifying dependencies in a computer network, dependencies are discovered through knowledge elicitation exercises, which are conducted largely by surveys of pertinent IT staff. Such approaches tend to be labor-intensive, time-consuming, and error-prone. Also, the results of such approaches may quickly become outdated as a computer network changes.

According to other approaches to identifying dependencies in a computer network, monitoring software ("agent" software) is deployed at network nodes to discover dependencies between network assets. In addition to being intrusive, the monitoring software can impact the performance of services. In real-world scenarios, such approaches can be difficult to deploy due to security concerns, performance concerns, and logistic concerns.

According to still other approaches to identifying dependencies in a computer network, dependencies between network assets are discovered by analyzing network traffic. Such approaches typically do not require the deployment of monitoring software at network nodes. As currently implemented, however, the approaches tend to produce too many false positives and/or false negatives, or otherwise fail to produce useful results.

SUMMARY

In summary, the detailed description presents innovations in the area of network analysis. For example, a network analysis tool receives network flow information and uses deep learning—machine learning that models high-level abstractions in the network flow information—to identify dependencies such as recurrent temporal sequence-based patterns between network assets. Based on the identified dependencies, the network analysis tool can discover functional relationships between network assets, which can in turn help decision-makers to assess the importance of the network assets to business processes that those network assets serve.

According to one aspect of the innovations described herein, a network analysis tool receives network flow information, identifies dependencies between multiple network assets based on evaluation of the network flow information, and outputs results of the identification of the dependencies. When evaluating the network flow information, the network analysis tool pre-processes the network flow information to produce input vectors, then uses deep learning to extract patterns in the input vectors. The network analysis tool determines the dependencies based on the extracted patterns. The dependencies can be recurrent temporal sequence-based patterns, where a recurrent temporal sequence-based pattern is a randomly initiated, repeating sequence of time-dependent elements. The network analysis tool can repeat this process so as to update an assessment of the dependencies between the multiple network assets on a near real-time basis.

For example, the network flow information is packet flow information including an n-tuple per network flow, where a network flow is an aggregation of packets that have common addressing attributes (such as the same source address, same source port or other transport-level attribute for the source, same destination address, and same destination port or other transport-level attribute for the destination). The network flow information can be received from network probes situated in a network (e.g., in routers in the network).

The pre-processing can include various stages. For example, the pre-processing includes (a) selectively converting unidirectional flow information to bidirectional flow information and/or (b) windowing the network flow information using a time interval. The pre-processing can also include (c) categorizing network flows based on attributes of the network flow information. For example, the network analysis tool assigns one of multiple categories as a function of the attributes of records of the network flow information. The pre-processing can further include (d) identifying instances of temporally proximate co-occurrences within the network flow information based on an ensemble approach. For example, the instances of temporally proximate co-occurrences are organized as a set of pairs of categorized records of the network flow information. The ensemble approach can be a weighted or un-weighted voting approach, an algebraic combiner approach or Bayesian modeling averaging approach. The ensemble approach can use, pool, or combine mutual information analysis, co-occurrence matrices followed by signal strength enhancement (such as normalization for statistical significant, e.g., z-score normalization), clustering (e.g., using a self-organizing map), auto-correlation/cross-correlation analysis, cepstrum analysis, probability analysis (e.g., Bayesian statistics), information-theoretic entropy analysis (e.g., Shannon entropy, Renyi entropy), and/or another approach. The network analysis tool can (e) check that categorization of the network flow information is stable over a period of time.

As part of the pre-processing, the network analysis tool can also (f) combine instances of temporally proximate co-occurrences within the network flow information into higher-order combinations, then (g) encode the higher-order combinations as the input vectors. Finally, the network analysis tool can (h) annotate the input vectors with details about the network flow information. Thus, each of the input vectors can include, for a given time period, information indicating the extent of co-occurrence of activity between network assets, in various combinations, during the given time period.

In general, the deep learning is machine learning that models high-level abstractions in the input vectors. The deep learning can use modeling architectures with non-linear transformations. When it uses deep learning, the network analysis tool can apply a neural network to reveal similarities between the input vectors. For example, the network analysis tool trains a self-organizing map using the input vectors. Such training produces weight vectors for nodes of the self-organizing map, where the weight vectors indicate the similarities between the input vectors. Alternatively, the network analysis tool uses another form of neural network. In any case, the neural network produces output vectors, which the network analysis tool can summarize. For example, to summarize the output vectors, the network analysis tool performs hierarchical clustering on weight vectors produced by the neural network, then associates the clustered weight vectors with corresponding details about the network flow information. The summarizing can make the identification of the dependencies more robust over time.

The innovations can be implemented as part of a method, as part of a computing system adapted to perform the method or as part of tangible computer-readable media storing computer-executable instructions for causing a computing system to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 6a and 6b are flowcharts illustrating a generalized technique for identification of dependencies between network assets using deep learning.

DETAILED DESCRIPTION

In a computer network, a service, application or other software (generally, a service) runs on a network node. A given service frequently depends on other services in the computer network. When one of the other services fails, the given service may be unable to perform its function. Information about the dependencies between network assets (e.g., network nodes, services) in a computer network can help a decision-maker during business planning, disaster recovery, crisis management or triage, or other scenarios.

The detailed description presents innovations in the area of network analysis. For example, a network analysis tool receives network flow information and uses deep learning—machine learning that models high-level abstractions in the network flow information—to identify dependencies between network assets. The identified dependencies can be recurrent temporal sequence-based patterns, which are randomly-initiated, repeating sequences of time-dependent elements. Based on the identified dependencies, the network analysis tool can discover functional relationships between network assets, which can in turn help decision-makers to assess the importance of the network assets to business processes that those network assets serve.

In the examples described herein, identical reference numbers in different figures indicate an identical component or module. Depending on context, a given component or module may accept a different type of information as input and/or produce a different type of information as output. More generally, various alternatives to the examples described herein are possible. For example, some of the methods described herein can be altered by changing the ordering of the method acts described, by splitting, repeating, or omitting certain method acts. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
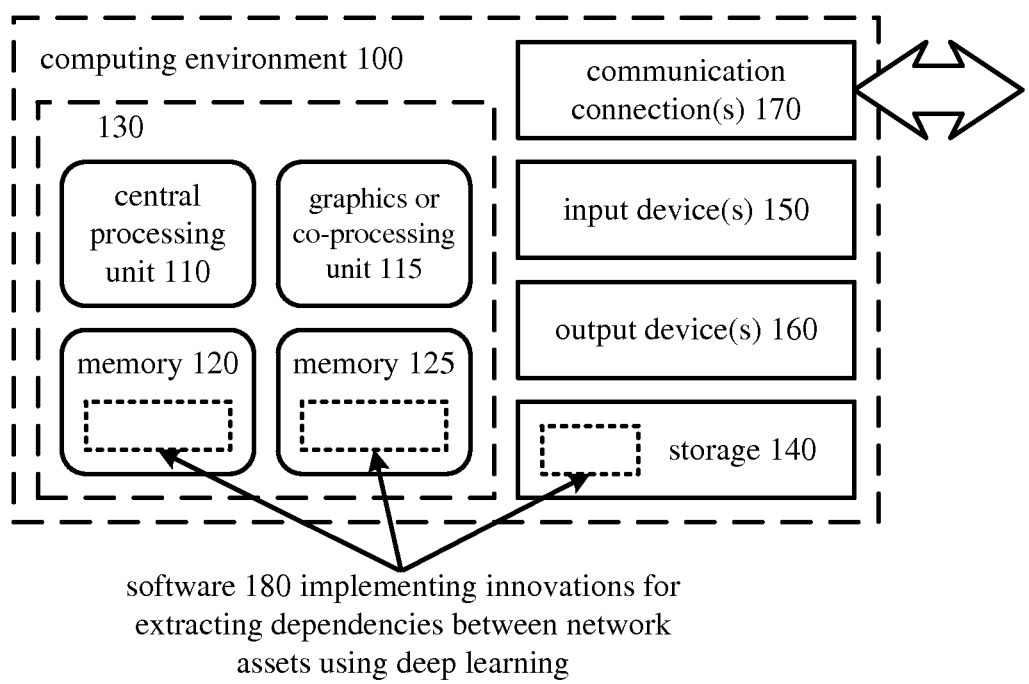
FIG. 1 is a diagram of an example computing system in which some described embodiments can be implemented.

FIG. 1 illustrates a generalized example of a computing system (100) in which several of the described innovations may be implemented. The computing system (100) is not intended to suggest any limitation as to scope of use or functionality, as the innovations may be implemented in diverse computing systems, including special-purpose computing systems adapted for network analysis using a deep learning workflow.

With reference to FIG. 1, the computing system (100) includes one or more processing units (110, 115) and memory (120, 125). The processing units (110, 115) execute computer-executable instructions. A processing unit can be a central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for extracting dependencies between network assets using deep learning, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, OS software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for extracting dependencies between network assets using deep learning.

The input device(s) (150) may be a touch input device such as a keyboard, mouse, pen, or trackball, a voice input device, a scanning device, touchscreen, or another device that provides input to the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in modules, being executed in a computing system on a target real or virtual processor. Generally, modules include routines, programs, libraries, objects, classes, components, data structures, etc. that perform particular tasks or implement particular abstract data types. The functionality of the modules may be combined or split between modules as desired in various embodiments. Computer-executable instructions for modules may be executed within a local or distributed computing system.

The terms "system" and "device" are used interchangeably herein. Unless the context clearly indicates otherwise, neither term implies any limitation on a type of computing system or device. In general, a computing system or device can be local or distributed, and can include any combination of special-purpose hardware and/or hardware with software implementing the functionality described herein. The disclosed methods can be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Extracting Dependencies Between Network Assets Using Deep Learning.

Although the behavior of computer networks is sometimes characterized as chaotic or unpredictable, once an element of a dependency structure between network assets is identified, other elements may be regular in terms of time and space. The regularity of the dependency structures between network assets can be observed as recurrent patterns in network flow information.

This section describes innovations in the area of network analysis, in which a network analysis tool receives network flow information and uses deep learning to identify dependencies between network assets. The deep learning models high-level abstractions in the network flow information. For example, the network analysis tool uses a self-organizing map ("SOM") or other type of neural network to identify clusters of similar interactions between network assets, then uses further analysis (e.g., multilevel clustering or decision support trees) to identify robust dependency structures. Depending on implementation, a network analysis tool incorporating one of the innovations described herein can provide one or more of the following advantages.

Based on identified dependencies, the network analysis tool can discover functional relationships between network assets, determining which network assets work together to provide some functionality in a computer network. This, in turn, can help decision-makers assess the "criticality" of network assets—the importance of the network assets to business processes that those network assets serve.

The network analysis tool can work by observing network activity (network traffic), without intervening in network activity or perturbing network activity. The network analysis tool can identify dependencies without imposing a performance penalty or logistic penalty.

The network analysis tool can use network flow information that is readily available in most computer networks. For example, the network analysis tool uses information available from routers in a computer network, such as network flow information in a NetFlow or IP Flow Information Export ("IPFIX") format.

The network analysis tool can use network flow information that summarizes network activity, without tracking or caching individual packets in a computer network. In addition to simplifying the analysis process, this can alleviate privacy concerns and security concerns.

The network analysis tool can update its assessment of dependencies between network assets on a near-real-time basis, using network flow information from a recent time period to give a near-current perspective on the state of a computer network. By reacting to network changes, this can further improve the quality and speed of decision-making processes based on the identified dependencies.

In general, using one or more of the innovations described herein, a network analysis tool can discover recurring temporal patterns in the network flow information. Repeated patterns of network activity in time and space suggest dependency relationships. Based on the repeated patterns, dependency relationships can be shown in a graphical model of a network. For example, the graphical model is a diagram in which vertices represent network assets and edges represent dependency relationships. The graphical model can further include annotations that show details about network assets (e.g., names of computer systems, network addresses, or protocol information shown as labels for the network assets) and/or show an assessment of criticality of the network assets, respectively.

A. Computer Networks, Dependencies, and Network Flow Information.

A computer network is a set of computer devices that exchange data along connections, which can be wired or wireless. A network node in a computer network can originate, route, or receive data. A service, application or other software (generally, a service) running on a network node rarely functions in isolation. More often, a service depends on functionality provided by one or more other service running at other network nodes.

1. Dependencies in Computer Networks.

In general, in a computer network, the pattern of a communication exchange involves a requester and a responder communicating across channels. A given service responds to queries or requests issued from some services (e.g., clients), but may also request performance of functions by other services. A given service A depends on another service B if the given service A is unable to complete its task without the other service B. This dependency between services A and B can be depicted A→B.

A dependency A→B is a local-remote dependency if the given service A depends on a remote service B to provide a service. For example, a Web service (as the given service A) may depend on a database (as the remote service B) to retrieve content. In this example, the remote service B is an upstream server of the given service A. On the other hand, a dependency A→B is a remote-remote dependency if a client (or other service) depends on a remote service B to access a given service A, which is also remote. For example, a Web service (as remote service A) depends on a DNS service (as remote service B) that a Web client uses to translate a hostname into a network address before the Web client can access the Web service. Local-remote dependencies are common in server-server configurations, while remote-remote dependencies are common in client-server configurations.

Figure 2:
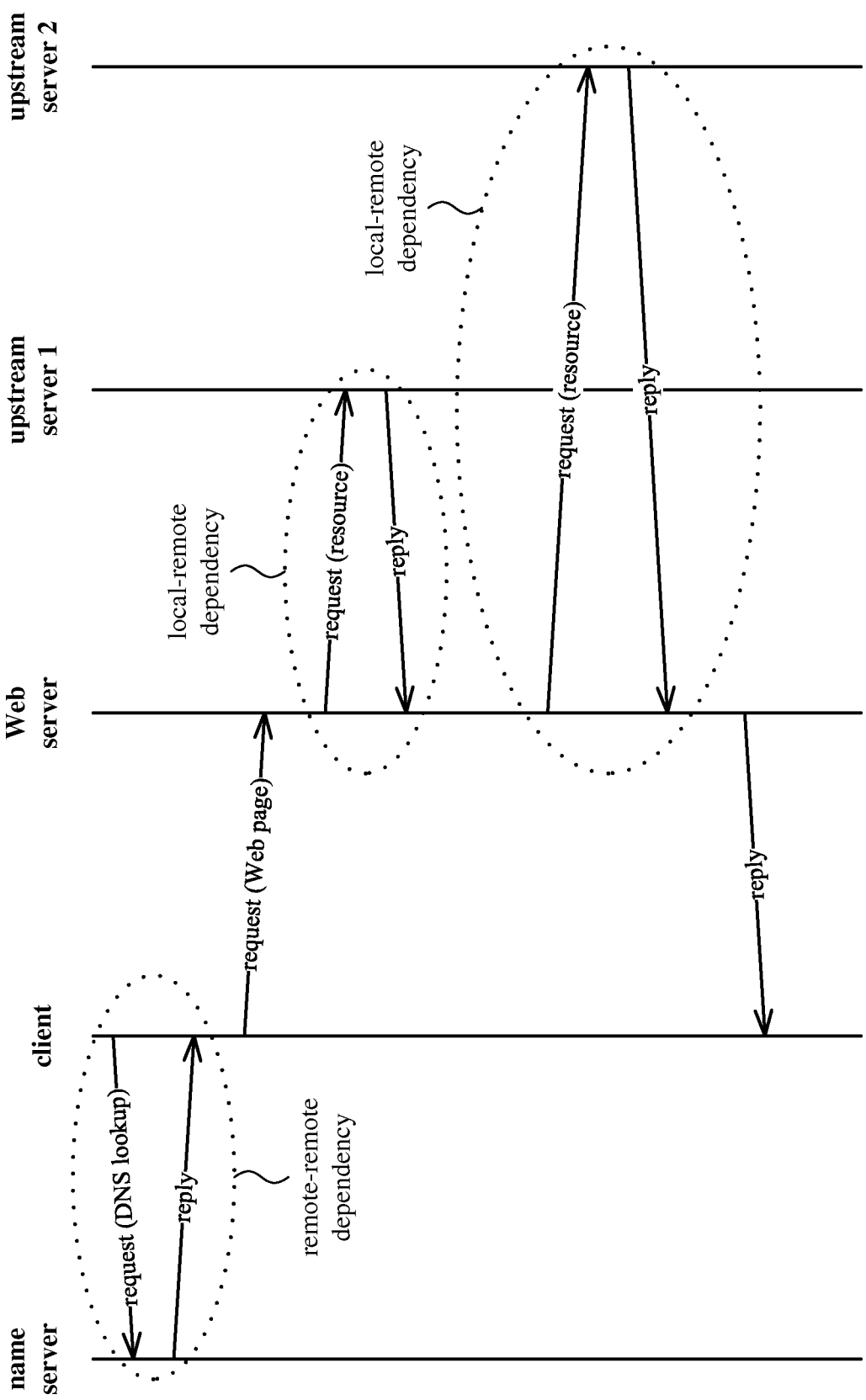
FIG. 2 is a diagram illustrating example dependencies during communication between a client and a service comprising multiple servers.

FIG. 2 is a timing diagram (200) that illustrates example dependencies during communication between a client and a service comprising multiple servers. A Web server has a remote-remote dependency. For the remote-to-remote dependency, the client sends a request for a DNS lookup operation to the name server, which performs the DNS lookup operation to resolve the Web server's hostname to a network address, then returns a reply to the client. Using the information provided by the name server, the client requests a Web page from the Web server. The Web server also has two local-remote dependencies, since the Web server depends on each of two upstream servers in order to provide the requested Web page to the client. The Web server sends a request for a resource to each of the two upstream servers. After each of the upstream servers processes its request from the Web server and returns a reply, the Web server returns a reply to the client.

In real-world scenarios, dependencies in server-server configurations or client-server configurations may be sporadically revealed. A Web service may cache database responses, obscuring a dependency between the Web service and database. A Web client may cache responses from a DNS service, obscuring dependencies between Web services and the DNS service.

2. Network Flow Information.

In a packet-switched computer network, data is transferred within the computer network in the form of packets. In addition to a data payload, a packet typically includes address information for a source (or originator) of the packet, address information for a destination (or recipient) of the packet, and protocol information. The Internet and other networks that use Internet protocol ("IP") addressing are examples of packet-switched networks.

In general, a network flow is an aggregation of packets that share common addressing attributes. For example, when a Web browser opens a connection to a Web server using transmission control protocol ("TCP"), there are at least two flows: one flow for the request from Web browser to the Web server, and another flow for the return of the response from the Web server to the Web browser. More formally, a network flow (also called a traffic flow, or simply a flow) is a sequence of packets sent from a particular source to a particular destination that the source desires to label as a flow. The destination can be a unicast, anycast or multicast destination. A network flow may include all packets in a specific transform connection or media stream, but does not necessarily have a one-to-one mapping to a transform connection or media stream.

Network flow information provides a description of a network flow, but does not provide the actual packets of the network flow. As metadata about packets, the network flow information is efficient to capture and record (compared to capturing and caching packets, which involves processing much more data), and it provides a measure of privacy to users of the computer network. For example, network flow information provides a high-level summary of the network flow as an n-tuple. The attributes of the n-tuple depend on implementation. In some formats, a network flow is represented as a 9-tuple:

(time$_{start}$, time$_{end}$, addr$_{src}$, addr$_{dst}$, ID$_{protocol}$, port$_{src}$, port$_{dst}$, num$_{pkts}$, num$_{octets}$), in which the time$_{start}$ and time$_{end}$ attributes represent the start time and end time, respectively, for the network flow. The addr$_{src}$, port$_{src}$, addr$_{dst}$, and port$_{dst}$ attributes represent the source address, source port, destination address, and destination port, respectively, for the network flow. For example, the addresses are IP addresses, and the ports are TCP ports or user datagram protocol ("UDP") ports. Alternatively, instead of source port and destination port, some other transport-level attributes can be used to identify the source and destination. (The src and dst labels identify endpoints in terms of the computer communications. They do not indicate any roles in terms of a client-server relationship.) The ID$_{protocol}$ attribute identifies the protocol (e.g., TCP, UDP) used for the network flow. Finally, the num$_{pkts}$ and num$_{octets}$ attributes indicate size or volume of a network flow in terms of a count of packets (num$_{pkts}$) or count of bytes (num$_{octets}$). Alternatively, an n-tuple for a network flow includes other and/or additional attributes. For example, network flow information for a network flow can include start time and duration attributes, rather than start time and end time attributes. In any case, packets with the same address signature (same values for addressing attributes and protocol ID) are included in the same network flow.

Examples of formats for network flow information include versions of NetFlow and IPFIX. A format for network flow information may include various format-specific fields. For example, NetFlow v5 defines thirteen fields per tuple, while the IPFIX format is extensible and defines over one hundred information fields.

Network flow information is typically unidirectional, representing packets flowing from a source to a destination as endpoints in a computer network. Network flow information can, however, be bidirectional flow (or "biflow") information that represents packets flowing in both directions between the endpoints. In this case, the src and dst labels can be replaced with labels such as first and second, or A and B, with labels assigned depending on the timing of initiation and response of the communication. For a bidirectional flow, network flow information can include separate statistics (such as $num_{pkts}$ and $num_{octets}$) for each direction.

Network flow information can be provided by network probes in a computer network. A typical network probe (also called a generator) combines the functionality of a packet meter and exporter. The packet meter generates flow information records from an observation point through which network traffic passes. The exporter receives records generated by the packet meter, aggregates the records into messages, and transmits the messages across the computer network to a collector. The collector receives messages from the various network probes, extracts the network flow information, and provides the network flow information to a network analysis tool. Network probes that produce network flow information in NetFlow and IPFIX formats can be deployed throughout a network. At the present time, NetFlow v5 is widely used to meter packets in multiple vendors' products such as network routers and switches. More recently, NetFlow v9 and IPFIX are starting to be implemented in products.

In operation, a collector can receive messages including network flow information from different network probes on an ad hoc basis. According to a push architecture, network probes can report network flow information periodically (e.g., every 5 minutes, every 15 minutes) or on some other basis. Or, according to a pull architecture, a collector can request new network flow information from network probes periodically or on some other basis. The more frequently network flow information for a computer network is updated, the closer the network analysis tool can get to providing a real-time assessment of dependencies in a computer network.

3. Recurrent Temporal Sequence-Based Patterns.

In network flow information, sequences of events (network flows in time periods) can be merged spatially and temporally (within a given time period). In any given time period, there may be one or more active sequences of events, including the possibility of multiple instances of the same sequence. In a typical computer network, certain patterns of interaction recur between network assets in the computer network. Over time, such regular interactions between network assets can create recurrent temporal sequence-based patterns in the network flow information. A recurrent temporal sequence-based pattern is a randomly-initiated sequence of time-dependent elements (such as network flows in a time period) that recurs in time. The elements of a recurrent temporal sequence-based pattern exhibit time conservation, which means the elements exhibit some temporal stability.

B. Example Software Architecture for Identifying Dependencies Between Network Assets Using Deep Learning.

Figure 3:
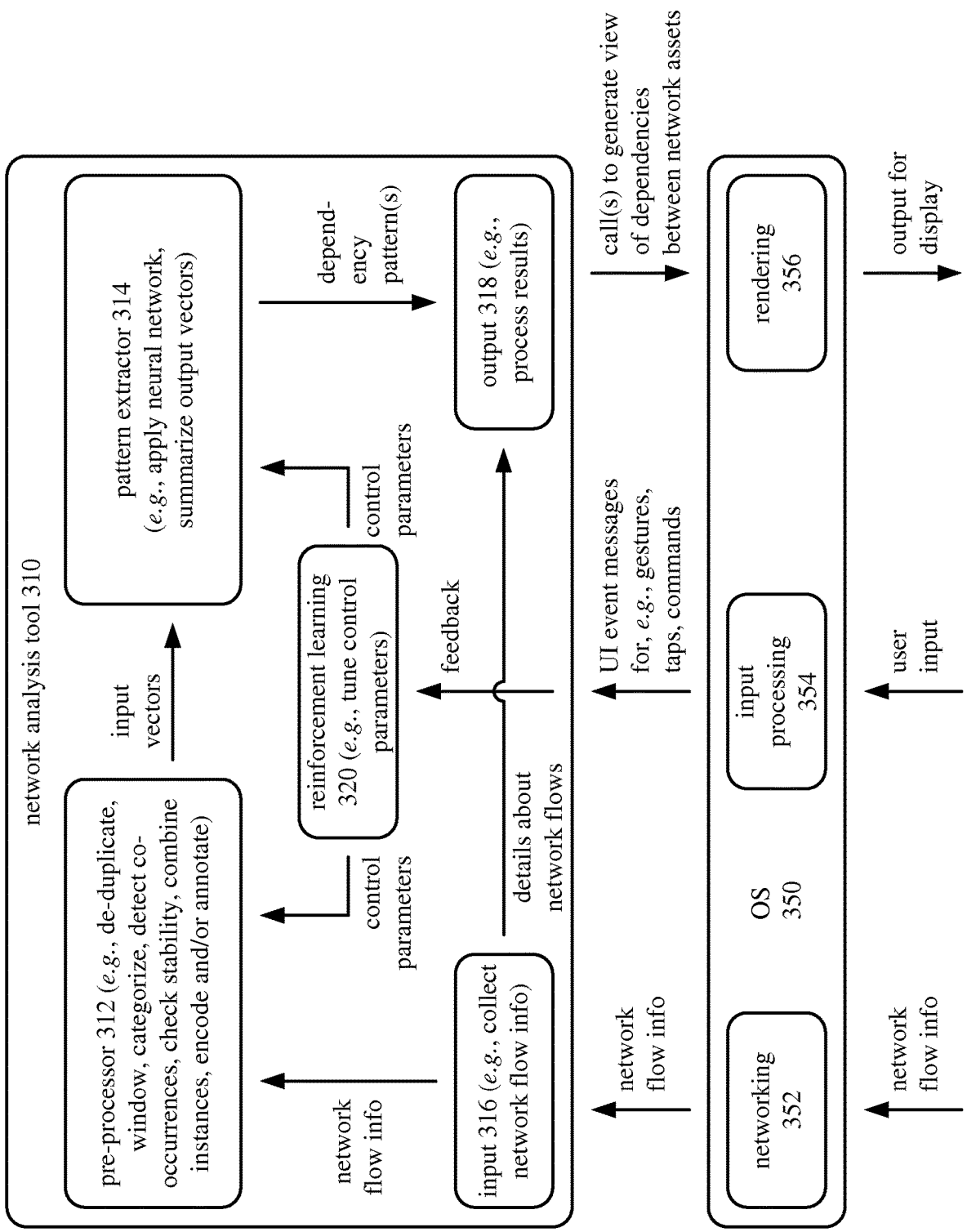
FIG. 3 is a block diagram illustrating an example software architecture in which a network analysis tool is configured to use deep learning to extract dependencies between network assets.

FIG. 3 shows an example software architecture (300) for a network analysis tool (310) that works with an operating system ("OS") (350) to identify dependencies between network assets using deep learning. A computing system (e.g., smartphone, tablet computer, personal computer, or other computing system) can execute software organized according to the architecture (300).

The architecture (300) includes an OS (350) and a network analysis tool (310) that use services of the OS (350). In FIG. 3, the OS (350) includes components for rendering (e.g., rendering visual output to a display), components for networking, and components for input processing. Other components of the OS (350) are not shown. In general, the OS (350) manages user input functions, output functions, storage access functions, network communication functions, and other functions for the computing system. The OS (350) provides access to such functions to the network analysis tool (310) and other software running on the computing system.

In a networking module (352), the OS (350) receives network flow information from one or more network probes of a computer network. The networking module (350) acts as a collector of messages that include the network flow information. The networking module (352) can provide the network flow information to the input module (316) of the network analysis tool (310) by passing the messages. Or, the networking module (352) can extract the network flow information from the messages and provide the network flow information directly to the input module (316) of the network analysis tool (310). The networking module (352) can send requests to network probes and/or send replies to network probes, regarding the messages that include the network flow information.

A user generates user input, which can be tactile input such as touchscreen input, mouse input, button presses or key presses, or can be voice input. In an input processing module (354), the OS (350) includes functionality for recognizing taps, finger gestures, or other input to a touchscreen, recognizing commands from voice input, mouse input, button input or key press input, and creating messages that can be used by the network analysis tool (310). The network analysis tool (310) listens for UI event messages from the OS (350). The UI event messages can indicate a gesture or tap on a touchscreen, mouse input, key press input, or another UI event (e.g., from voice input, directional buttons, trackball input). If appropriate, the network analysis tool (310) can react to the user input (or another type of notification) by making one or more calls to the OS (350) or performing other processing. In particular, based on user input, a reinforcement learning module (320) of the network analysis tool (310) can tune control parameters for preprocessing and/or pattern extraction.

The network analysis tool (310) includes a pre-processor (312), a pattern extractor (314), an input module (316), an output module (318), and a reinforcement learning module (320). Overall, the network analysis tool (310) receives network flow information, identifies dependencies between network assets of a computer network using a deep learning workflow, and outputs results of the identification of the dependencies.

The input module (316) receives network flow information (e.g., as part of messages, as records of network flow information) from the networking module (352) of the OS (350). The input module (316) collects the network flow information and provides it to the pre-processor (312).

Figure 4:
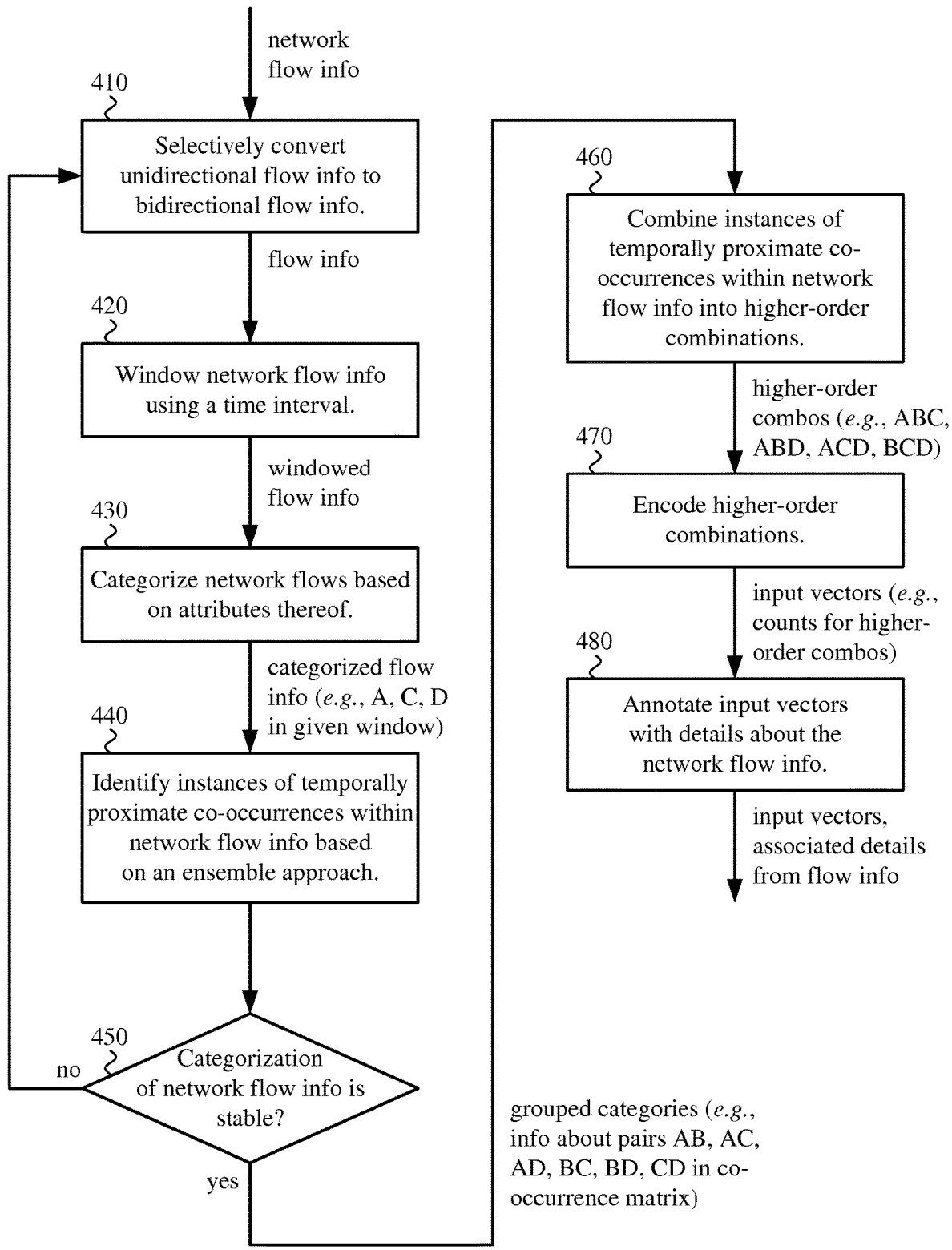
FIG. 4 is a block diagram illustrating example stages of pre-processing in the network analysis tool of FIG. 3.

The pre-processor (312) receives the network flow information from the input module (316) and processes the network flow information to produce input vectors for the deep learning workflow. One or more control parameters can control stages of processing in the pre-processor (312). For example, the pre-processor (312) performs stages of processing to: (a) de-duplicate the network flow information (combining unidirectional flows into bidirectional flows, where appropriate); (b) window the network flow information; (c) categorize network flows; (d) detect co-occurrences of events in the network flow information; (e) check the stability of categorization; (f) combine instances of co-occurrences into higher-order combinations; (g) encode higher-order combinations into input vectors; and/or (h) annotate the input vectors. FIG. 4 shows additional details for such stages of pre-processing in some examples. Alternatively, the pre-processor (312) performs other and/or additional stages of pre-processing. The pre-processor (312) provides the input vectors to the pattern extractor (314).

Figure 5:
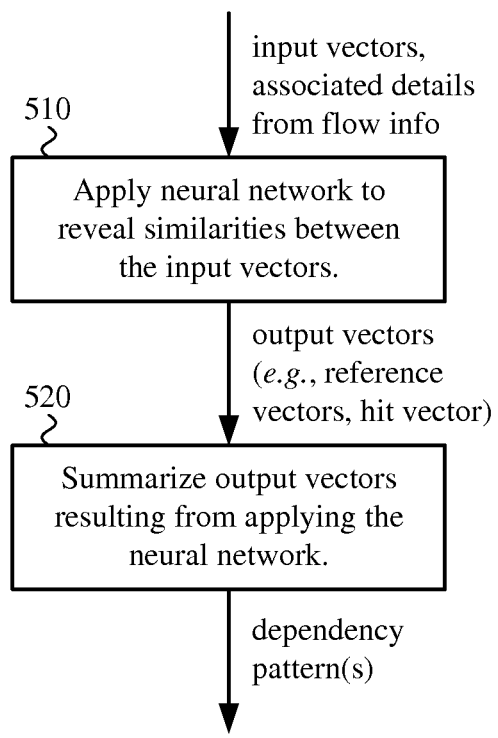
FIG. 5 is a block diagram illustrating example stages of pattern extraction in the network analysis tool of FIG. 3.

The pattern extractor (314) uses the deep learning workflow to extract patterns in the input vectors provided by the pre-processor (312). The deep learning is a set of coordinated machine learning approaches that model high-level abstractions in the input vectors. One or more control parameters can control stages of processing in the pattern extractor (314). For example, the pattern extractor (314) applies a neural network to the input vectors, producing output vectors (weight vectors). The neural network can be a self-organizing map ("SOM") or other type of neural network. The pattern extractor (314) can then summarize the output vectors, so as to identify recurrent patterns in the network flow information. FIG. 5 shows additional details for such stages of pattern extraction in some examples. Alternatively, the pattern extractor (314) performs other and/or additional stages of pattern extraction using a different deep learning workflow. The pattern extractor (314) provides one or more dependency patterns to the output module (318).

The output module (318) receives the dependency pattern(s) from the pattern extractor (314). The output module (318) can also receive details about the network flows in the network flow information. Such details can be added to the input vectors (as labels or other annotations) by the pre-processor (312). Or, such details can be passed directly by the input module (316). In any case, the output module (318) processes the dependency pattern(s) (and other details about the network flows) to make one or more calls to the OS (350) to generate a view of the dependencies between the network assets of the computer network.

In a rendering module (356), the OS (350) handles the call(s) from the output module (318) of the network analysis tool (310) to generate a view of the dependencies between the network assets of the computer network. For example, the rendering module (356) renders a graphical model of the computer network. For the graphical model, vertices in a diagram can represent network assets, and edges in the diagram can represent dependency relationships. The graphical model can also include annotations to show details about network assets (e.g., names of computer systems, network addresses, or protocol information shown as labels). The graphical model can emphasize the criticality of the network assets, respectively (e.g., with different colors for different levels of criticality). Alternatively, the dependencies between network assets of a computer network can be shown in some other form of graphical representation.

The reinforcement learning module (320) sets control parameters for the pre-processor (312) and/or the pattern extractor (314), and can hence provide feedback within the network analysis tool (310). The feedback can influence the pipeline of processing within the network analysis tool (310), thereby improving accuracy of the network analysis. Initially, the control parameters can have default values or values from a prior session of network analysis. The reinforcement learning module (320) can then tune the control parameters based on user input, e.g., reacting to a graphical model rendered by the rendering module (356). For example, through input to a graphical user interface, an analyst (user) can select network assets, combinations of network assets, or dependencies that should be ignored in subsequent analysis because such network assets, combinations, dependencies, etc. represent "false positives" in the output. Or, as another example, through input to a graphical user interface, the analyst (user) can select network assets, combinations of network assets, or dependencies that should get extra attention, weight or detail in subsequent analysis because such network assets, combinations, dependencies, etc. are of particular interest to the analyst, or are confirmed to be part of meaningful results. The reinforcement learning module (320) can also tune control parameters based on feedback from within the network analysis tool (310), e.g., based on thresholds defined so as to remove from consideration events that are insignificant or are outliers.

The control parameters used within the network analysis tool (310) depend on implementation. For example, the control parameters can include: (1) a control parameter that controls co-occurrence detection during pre-processing; (2) a control parameter that controls how instances of temporally proximate co-occurrences are combined during pre-processing; (3) a control parameter (such as neural network stack depth) that controls how a neural network is applied during pattern extraction; and/or (4) a control parameter that controls summarization of output vectors during pattern extraction. Alternatively, the control parameters include other and/or additional control parameters.

Alternatively, the OS (350) includes more or fewer modules. Or, the network analysis tool (310) includes more or fewer modules. A given module can be split into multiple modules, or different modules can be combined into a single module.

C. Example Stages of Pre-Processing.

FIG. 4 shows example stages (400) of pre-processing by the pre-processor (312) of FIG. 3. The network analysis tool (310) can perform all of the example stages (400) of pre-processing shown in FIG. 4. Or, the network analysis tool can perform a subset of the example stages (400) of pre-processing shown in FIG. 4. Overall, the stages (400) of pre-processing convert network flow information into a form suitable for machine learning by the pattern extractor (314).

With reference to FIG. 4, after collecting network flow information (as described above), the network analysis tool selectively converts (410) unidirectional flow information to bidirectional flow information, combining flows where appropriate to do so. For example, the network analysis tool sorts records of network flow information by start time, identifies any pair of unidirectional flows in which start addresses and destination addresses are switched (flows in opposite directions), and aggregates packet data for that pair of unidirectional flows into a single bidirectional flow. Combining unidirectional flows into bidirectional flows can simplify later processing by significantly reducing the number of network flows considered.

Some unidirectional flows do not have a matching unidirectional flow in the opposite direction. Such a unidirectional flow can nevertheless be summarized as a bidirectional flow. Or, the network analysis tool can simply discard network flow information for a unidirectional flow that lacks a matching unidirectional flow in the opposite direction.

The network analysis tool then windows (420) network flow information using a time interval. The network analysis tool segments network flows into windows having the time interval. The duration of the time interval depends on implementation. For example, the time interval is 5 seconds, 30 seconds, 120 seconds, 10 minutes, 30 minutes or some other duration of time. In some examples, the network analysis tool converts records of network flow information into a vector representation of n-tuples in a given time interval. For example, the n-tuple for a network flow (bi-flow) includes: (time$_{start}$, time$_{end}$, addr$_{src}$, addr$_{dst}$, ID$_{protocol}$, port$_{src}$, port$_{dst}$). The addresses can be IP addresses, and the ports can be TCP or UDP ports. Alternatively, the n-tuple includes other and/or additional attributes.

The network analysis tool then categorizes (430) the windowed network flows based on attributes of the windowed network flows. For the categorizing (430) stage, the network analysis tool assigns a record of network flow information to one of multiple possible categories based on the attributes of the record. The categories can be represented as letters (e.g., A, B, C, D, etc.) in an alphabet, which is the set of possible letters. For this reason, the categorizing (430) stage can be termed "letterization," "letterizing," or, more generally, "binning." The output of the letterizing process is a sequence of labels for categorized records of network flow information (e.g., C, D, A, D, E, J) in a window.

In general, the letters (categories) represent events in the event space that is considered for pattern extraction using a deep learning workflow (e.g., event$_A$, event$_B$, event$_C$, event, etc. for letters A, B, C, D, etc.). The network analysis tool can use the letterizing process to reduce the number of possible discrete events (mapping j possible network flows to k possible bins), so as to make the subsequent machine learning more computationally tractable. Or, the network analysis tool can use the letterizing process to combine insignificant network flows, or to combine flows of a particular type or role of communication.

The network analysis tool can dynamically define the bins used to categorize records of network flow information, as well as the rules used to categorize records. For example, the network analysis tool generates/names the bins that characterize the event space for deep learning based on which source addresses, destination addresses, source ports (or other transport-level attributes for the source) and destination ports (or other transport-level attributes for the destination) are associated with network traffic. Using rules that categorize all network flows in the same way would be unproductive. At the other extreme, having rules that categorize all network flows in different categories may increase the computational complexity of subsequent machine learning processes to a prohibitive level. Alternatively, the network analysis tool can use pre-defined bins to categorize records of network flow information.

The letterizing process involves rule-based binning of records of network flow information. The network analysis tool places records in bins by applying one or more rules to the attributes of the records. The rules can be represented as a function $f$(attribute$_1$, attribute$_2$, . . . , attribute$_n$) that maps a record to a letter (category). For example, the function $f$(addr$_{src}$, addr$_{dst}$, ID$_{protocol}$, port$_{src}$, port$_{dst}$) maps a record of network flow information in a window to a category. Examples of rules used in the letterizing process include the following.

Ignore part or all of source address (e.g., using a subnet mask to ignore part of source address). With this rule, the network analysis tool can group network flows from different sources (e.g., different Web clients) to the same destination (e.g., same service on a Web server). Using a subnet mask, the network analysis tool can group network flows from different sources within the same sub-network.

Ignore source port (or other transport-level attribute for the source). With this rule, the network analysis tool can group network flows from a given source address, regardless of source port (or other transport-level attribute for the source).

Ignore part or all of destination address (e.g., using a subnet mask to ignore part of destination address). With this rule, the network analysis tool can group network flows to different destinations from a given source.

Ignore, or account for, port numbers excluded from, or included in, a registry (e.g., IANA Service Name and Transport Protocol Port Number Registry).

A combination of one or more of the preceding rules.

After the letterizing process, based on an ensemble approach, the network analysis tool identifies (440) instances of temporally proximate co-occurrences of events within the network flow information. That is, the network analysis tool checks for temporal co-occurrences of letters within a temporal distance. A temporal co-occurrence of letters suggests the existence of a dependency relationship among the letters. The output of the co-occurrence detection is a set of letters (grouped categories) that co-occur within a certain temporal distance. For example, the temporal distance is the same duration as the time interval used during windowing (that is, the temporal distance is a single window). Alternatively, the temporal distance is another duration such as 1 second, 10 seconds, 30 seconds or another duration of time. Typically, the temporal distance for co-occurrence detection is shorter than the temporal distance for windowing—that is, co-occurrence detection generally happens within a given window.

The output of the co-occurrence detection can be information about pairs of co-occurring letters. In FIG. 4, the output of the co-occurrence detection is information about pairs AB, AC, AD, BC, BC, CD in a co-occurrence matrix. For example, the output is organized as a two-dimensional array of elements—a co-occurrence matrix—where the indices of the array are possible values of letters, and each element indicates whether a possible pair of letters is present (co-occurring) in the categorized records within the time interval. The following simplified co-occurrence matrix shows presence/absence for pairs of possible letters (A, B, C, D) in a time interval.

|  | event$_A$ | event$_B$ | event$_C$ | event$_D$ |
|---|---|---|---|---|
| event$_A$ | — | true | false | true |
| event$_B$ | true | — | false | false |
| event$_C$ | false | false | — | true |
| event$_D$ | true | false | true | — |

The pairs AB, AD, and CD are present within the time interval. Other pairs are not present. The matrix includes redundant values (above the diagonal or below the diagonal), which need not be counted. Alternatively, the co-occurrence matrix includes count values for the respective pairs of possible letters in a time interval, as shown in the following simplified example.

|  | event$_A$ | event$_B$ | event$_C$ | event$_D$ |
|---|---|---|---|---|
| event$_A$ | — | 3 | 0 | 1 |
| event$_B$ | 3 | — | 0 | 0 |
| event$_C$ | 0 | 0 | — | 1 |
| event$_D$ | 1 | 0 | 1 | — |

In this example, 3 instances of the pair AB, 1 instance of the pair AD, and 1 instance of the pair CD are present in the time interval. Other pairs are not present. Again, the matrix includes redundant values (above the diagonal or below the diagonal), which need not be counted.

Alternatively, the network analysis tool detects co-occurrence of some other number of letters (e.g., 3 co-occurring letters, 4 co-occurring letters) in a time interval.

The network analysis tool can simplify later analysis by removing singleton letters, which do not co-occur with any other letter. In this way, the network analysis tool restricts subsequent analysis to pairs of letters that co-occur, or combinations of such pairs, which reduces the event space and reduces computational complexity of machine learning stages. Removed singleton letters can also be flagged for elimination from consideration in later intervals. Alternatively, the output of the co-occurrence detection can include singleton letters.

The ensemble approach can be a weighted or un-weighted voting approach, an algebraic combiner approach or Bayesian modeling averaging approach. The ensemble approach can use, pool or combine any of several techniques for co-occurrence detection. For example, the ensemble approach can use a mutual information approach, a co-occurrence matrix followed by signal strength enhancement (such as normalization for statistical significance, e.g., z-score normalization), clustering (e.g., using a self-organizing map), an auto-correlation (cross-correlation) approach, cepstrum analysis (cepstral analysis), probability analysis (e.g., Bayesian statistics), information-theoretic entropy analysis (e.g., Shannon entropy, Renyi entropy), or another approach, or some combination of the preceding approaches in this paragraph.

The approaches to co-occurrence detection process signals in the network flow information. In the context of co-occurrence detection, a signal is a time series of a single letter. More formally, a signal is a set of triples {a, s, d}, where a is the letter from the alphabet and is an event, s is the time that the event is observed, and d is the duration of the event.

Cepstral Analysis.

The goal of cepstral analysis is to separate a signal into its source and noise components without prior knowledge of the system. The cepstrum of a signal is commonly defined as the inverse Fourier transform of the log-magnitude Fourier spectrum. The source and noise components of a signal become additive under the logarithmic operation, allowing for easy separation. The cepstral graph represents the quefrency (that is, the frequency of a frequency) of a signal. Noise tends to be a slowly varying component that appears in a lower quefrency region, while source components tend to appear as peaks in a higher quefrency region.

Cross-Correlation.

Cross-correlation is a measure of similarity between two time series (here, a time series is a run of a single letter) as a function of difference in time or lag applied to one of them.

Auto-Correlation.

Autocorrelation is the cross-correlation of a signal with itself. Auto-correlation represents the similarity between observations as a function of the time lag between them. Auto-correlation is useful for identifying repeating patterns in the presence of noise in a signal.

Information-Theoretic Entropy.

Information-theoretic entropy is a measurement, usually in terms of number of bits, of the amount of information content in a message or signal. It quantifies the "regularness" or "predictability" of the information. Joint and conditional entropy between two time series (here, a time series is a run of a single letter) is sensitive to and measures the amount of correlation (dependence) between the two time series. Examples of such entropy measures are defined by Shannon and Renyi.

Mutual Information:

Mutual information is a measurement of how much information one random variable (here, a letter for records of network flow information) reveals about another. A higher value of mutual information between two variables indicates a high measure of mutual dependence. A value of zero indicates that the two variables are independent of each other. Mutual information can also be expressed in terms of entropy between two variables. Pointwise mutual information ("PMI") is used as a measure of association between two variables. It measures the probability of their coincidence given their joint distribution against the individual distributions. Mutual information can be expressed as the expected value of PMI over all possible outcomes. As with mutual information, PMI is zero when two variables are independent and highest when the two variables are perfectly associated.

A control parameter that is set or tuned during reinforcement learning can affect the co-occurrence detection. For example, the control parameter limits which events can be classified as co-occurring, based on feedback about co-occurrences classified as "false positives" in prior analysis. Or, as another example, the control parameter promotes certain events as being classified as co-occurring, based on feedback to prior analysis. The control parameter can be implemented as one or more rules for classification.

After the co-occurrence detection, the network analysis tool checks (450) whether categorization of network flow information is stable. For example, the network analysis tool checks whether the alphabet of letters stays within a threshold tolerance over a particular duration such as 10 minutes, 30 minutes, 2 hours, 8 hours, 1 day or some other duration of time. (The duration is dependent on goals of the observation. Shorter durations are sensitive to sequences with shorter durations. Longer durations are sensitive to sequences with longer durations.) If not, the network analysis tool returns to the selective conversion (410) stage and attempts pre-processing with a new categorization scheme. Otherwise (categorization is stable), the network analysis tool continues to the next stages of pre-processing.

After the network analysis tool determines that the categorization is stable, the network analysis tool combines (460) instances of temporally proximate co-occurrences within the network flow information into higher-order combinations. For example, the network analysis tool combines pairs of co-occurring letters into sets of three co-occurring letters (such as ABC, ABD, ACD and BCD) or sets of four co-occurring letters (such as ABCD). Creating higher-order combinations further simplifies processing during subsequent machine learning stages.

A control parameter that is set or tuned during reinforcement learning can affect how instances of temporally proximate co-occurrences are combined into higher-order combinations. For example, the control parameter limits which instances are combined, based on feedback about combinations classified as "false positives" in prior analysis. Or, as another example, the control parameter promotes certain instances as being classified as higher-order combinations, based on feedback to prior analysis. The control parameter can be implemented as one or more rules for classification.

The network analysis tool next encodes (470) the higher-order combinations, producing input vectors in a form suitable for ingestion by the pattern extractor (314). The network analysis tool can encode the higher-order combinations as binary values for the occurrence/non-occurrence of the respective combinations in a time interval such as 10 minutes, 30 minutes, 2 hours, 1 day or some other duration of time. In this case, an input vector includes a binary value per possible letter combination in the time interval. Or, as another example, the network analysis tool encodes the higher-order combinations as counts of occurrences in a time interval. In this case, an input vector includes a count value per possible letter combination in the time interval. Or, as another example, the network analysis tool encodes normalized counts of occurrences in a time interval. The network analysis can also encode time offsets for the occurrences (from a marker flow) in a time interval.

The network analysis tool annotates (480) the input vectors with details about the network flow information. For example, the network analysis tool adds labels about network flows in hidden columns of the input vectors. This produces the input vectors with associated details from the network flow information.

The network analysis tool can omit one or more stages of the pre-processing. For example, the network analysis tool can skip the selective conversion to bidirectional flows. Or, the network analysis tool can skip the stability check for categorization. Or, the network analysis tool can skip the creation of higher-order combinations.

D. Example Stages of Pattern Extraction.

FIG. 5 shows example stages (500) of pattern extraction by the pattern extractor (314) of FIG. 3. The network analysis tool (310) can perform all of the example stages (500) of pattern extraction shown in FIG. 5. Or, the network analysis tool can perform a subset of the example stages (500) of pattern extraction shown in FIG. 5. Overall, the stages (500) of pattern extraction use a deep learning workflow to discover recurrent patterns in the input vectors from the pre-processing stage. The deep learning workflow (also called a deep structural learning workflow or hierarchical learning workflow) is a set of algorithms in machine learning that models high-level abstractions in the input vectors. The deep learning workflow typically uses non-linear transformations.

With reference to FIG. 5, the network analysis tool applies (510) a neural network to reveal similarities between input vectors. For example, the network analysis tool applies a SOM, which is a two-dimensional unsupervised neural network that can be used to generalize, quantify and identify patterns in the input vectors. In general, a SOM associates output nodes of the SOM with groups or patterns in the input data set. The network analysis tool trains the SOM using the input vectors, which produces weight vectors for the nodes, respectively, of the SOM. The weight vectors indicate the similarities between the input vectors. Alternatively, the network analysis tool uses another type of neural network.

A control parameter that is set or tuned during reinforcement learning can affect how a neural network is applied. For example, the control parameter sets a neural network stack depth or other parameter for application of the neural network.

The neural network produces output vectors. For example, an SOM produces output reference vectors (with weights for nodes of the SOM) as well as an output hit vector (with information about the response of the SOM to the input vectors, e.g., how many times the respective nodes of the SOM were utilized during the training process, or a summary of influence of the respective nodes during the training process). The SOM can also produce other output information (such as an output distance vector indicating pairwise distances between the input vectors, or distances between output weight vectors from the SOM).

The network analysis tool then summarizes (520) the output vectors that result from applying the neural network, producing one or more dependency patterns. For example, the network analysis tool performs hierarchical clustering on the output vectors. In general, the hierarchical clustering successively groups output vectors that are "close" according to some metric (such as Euclidean distance, squared Euclidean distance, Manhattan distance or maximum distance) and linkage criteria, gradually collapsing the initial output vectors into fewer output vectors, until an exit condition is reached (e.g., relating to the number of collapses or distance between remaining (collapsed) output vectors). When an SOM supplies output reference vectors and an output hit vector to the hierarchical clustering, the network analysis tool can perform z-score normalization on the output reference vectors.

The SOM and hierarchical clustering can operate over a longer time period than the windowing stage and other stages of the pre-processing. For example, the time period is 1 hour, 2 hours, 12 hours, 24 hours, 36 hours, 48 hours, or some other duration of time. By summarizing the output vectors over time, the network analysis tool can make the process of detecting patterns in the input vectors more robust.

Alternatively, instead of using an SOM and hierarchical clustering to extract the dependency patterns from the input vectors, the network analysis tool can use another machine learning approach (e.g., a decision support tree, which is a tree-like graph of decisions and consequences, for summarization; or one or more of the modules used for co-occurrence detection as described with reference to stage (440) of FIG. 4; or a layered combination of any of the preceding machine learning approaches, including SOM and hierarchical clustering). In any case, the network analysis tool discovers signatures for patterns in the input vectors.

A control parameter that is set or tuned during reinforcement learning can affect how output vectors are summarized. For example, the control parameter limits which output vectors can be clustered, based on feedback about clustering classified as yielding "false positives" in prior analysis. Or, as another example, the control parameter promotes certain output vectors being clustered, based on feedback to prior analysis. The control parameter can be implemented as one or more rules for clustering.

E. Techniques for Identifying Dependencies Between Network Assets Using Deep Learning.

Figure 6A:
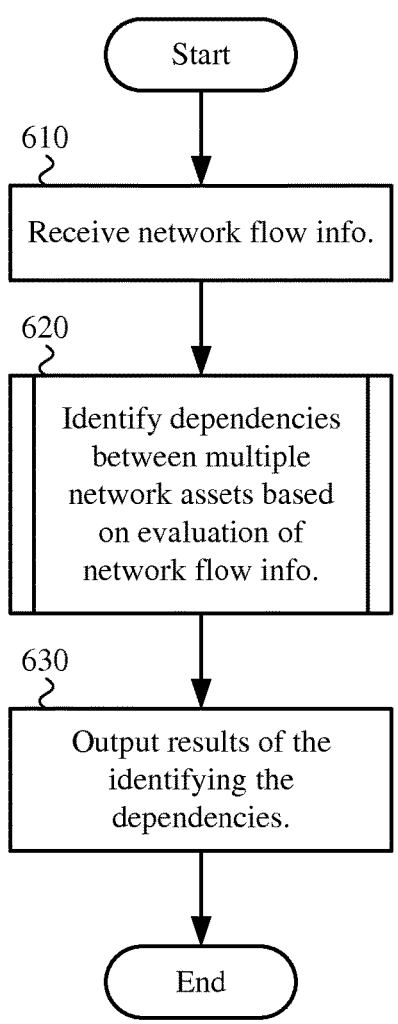
Figure 6A:
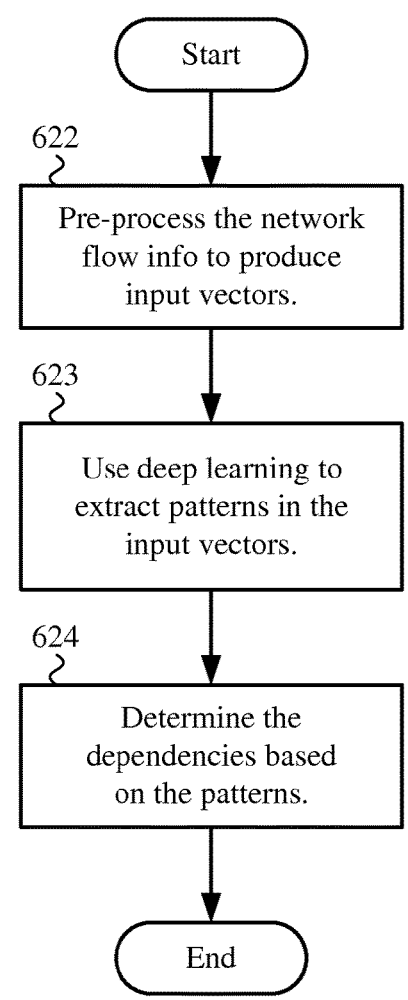

FIG. 6a illustrates a generalized technique (600) for identification of dependencies between network assets using deep learning. The technique (600) can be performed by a network analysis tool as described with reference to FIG. 3 or another network analysis tool.

To start, the network analysis tool receives (610) network flow information. For example, the network flow information is packet flow information including an n-tuple per network flow, where a network flow is an aggregation of packets that have common addressing attributes (such as the same source address, same source port or other transport-level attribute for the source, same destination address, and same destination port or other transport-level attribute for the destination). The network flow information can be received from network probes situated in a network (e.g., in routers in the network) or received from one or more other providers as part of a push architecture or pull architecture for delivering network flow information. The format of the network flow information can be a NetFlow format, IPFIX format or other format.

The network analysis tool identifies (620) dependencies between multiple network assets based on evaluation of the network flow information. For example, the network analysis tool identifies (620) dependencies between the multiple network assets using the approach shown in FIG. 6*b* or another approach. FIG. 6*b* illustrates example stages (621) of processing performed when identifying dependencies between network assets.

With reference to FIG. 6*b*, when evaluating network flow information, the network analysis tool can pre-process (622) the network flow information to produce input vectors. Examples of pre-processing stages are described above with reference to FIG. 4. The pre-processing can include various stages. For example, the pre-processing includes one or more of: (a) converting unidirectional flow information to bidirectional flow information; (b) windowing the network flow information using a time interval; (c) categorizing network flows based on attributes of the network flow information; (d) identifying instances of temporally proximate co-occurrences within the network flow information based on an ensemble approach; (e) checking that categorization of the network flow information is stable over a period of time; (f) combining instances of temporally proximate co-occurrences within the network flow information into higher-order combinations; (g) encoding such higher-order combinations as the input vectors; and (h) annotating the input vectors with details about the network flow information (such as network addresses). Alternatively, the pre-processing (622) includes other and/or additional stages. Thus, each of the input vectors can include, for a given time period, information indicating the extent of co-occurrence of activity between network assets, in various combinations, during the given time period.

When categorizing a network flow based on its attributes (see stage c), the network analysis tool can assign one of multiple categories as a function of the attributes of a record of the network flow information. For example, the attributes are source address, source port (or other transport-level attribute for the source), destination address, destination port (or other transport-level attribute for the destination) and/or protocol. Examples of rules applied during categorization are described with reference to FIG. 4. Alternatively, the network analysis tool applies other and/or additional rules when categorizing records of network flow information.

When identifying instances of temporally proximate co-occurrences within network flow information based on an ensemble approach (see stage d), the ensemble approach can use mutual information analysis, co-occurrence matrices followed by signal strength enhancement (such as normalization for statistical significance, e.g., z-score normalization), clustering (e.g., using a self-organizing map), auto-correlation/cross-correlation analysis, cepstrum analysis, probability analysis (e.g., Bayesian statistics), information-theoretic entropy analysis (e.g., Shannon entropy, Renyi entropy), and/or another approach. The instances of temporally proximate co-occurrences can be organized as a set of pairs of categorized records of the network flow information. Or, the instances of temporally proximate co-occurrences can be organized in some other way.

When encoding higher-order combinations as input vectors (see stage g), the encoding can indicate, for a given one of multiple possible higher-order combinations in a time interval, the presence or absence of the given higher-order combination in the time interval. Or, as another example, the encoding can indicate the count of the given higher-order combination in the time interval. Or, the network analysis tool can encode information about the higher-order combinations in an input vector in some other way.

After the pre-processing (622), the network analysis tool can use (623) deep learning to extract patterns in the input vectors. In general, the deep learning is machine learning that models high-level abstractions in the input vectors. The deep learning can use modeling architectures with non-linear transformations. When it uses deep learning, the network analysis tool can apply a neural network to reveal similarities between the input vectors. For example, when it applies the neural network, the network analysis tool trains a SOM using the input vectors. Such training produces weight vectors for nodes of the SOM, where the weight vectors indicate the similarities between the input vectors. Alternatively, the network analysis tool uses another form of neural network for the deep learning, or the network analysis tool uses some other form of deep learning.

The network analysis tool determines (624) the dependencies based on the extracted patterns. The dependencies can be recurrent temporal sequence-based patterns, where a recurrent temporal sequence-based pattern is a randomly-initiated, repeating sequence of time-dependent elements. For example, as part of the deep learning, a neural network produces output vectors, which the network analysis tool summarizes. To summarize the output vectors, the network analysis tool can perform hierarchical clustering on the output vectors (weight vectors) produced by the neural network. Such summarizing can make the identification of dependencies more robust over time. The network analysis tool can then associate the clustered output vectors with corresponding details about the network flow information. Alternatively, the network analysis tool summarizes output vectors in some other way.

Returning to FIG. 6*a*, the network analysis tool outputs (630) results of the identification of the dependencies. For example, dependency relationships can be shown in a graphical model of a network, where the graphical model is a diagram in which vertices represent network assets and edges represent dependency relationships. The graphical model can further include annotations that show details about network assets (e.g., names of computer systems, network addresses, or protocol information shown as labels for the network assets) and/or show an assessment of criticality of the network assets, respectively. Alternatively, the network analysis tool outputs (630) results of the identification of the dependencies in some other way.

Using updated network flow information, the network analysis tool can repeat the process shown in FIG. 6*a* so as to update an assessment of the dependencies between the multiple network assets on a near real-time basis.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media storing computer-executable instructions for causing a computing system, when programmed thereby, to perform:
- receiving network flow information, the network flow information summarizing packet flow between pairs of network assets over one or more time periods;
- identifying functional dependencies between multiple network assets based on evaluation of the network flow information, wherein a functional dependency between network assets indicates that a first network asset comprises a service whose operation is dependent on a service provided by a second network asset, wherein the evaluation includes:
  - pre-processing the network flow information to produce input vectors, the pre-processing comprising:
    - combining instances of temporally proximate co-occurrences within the network flow information into higher-order combinations;
    - encoding the higher-order combination as the input vectors; and
    - annotating the input vectors with details about the network flow information;
  - using deep learning to extract patterns in the input vectors, at least in part by applying a neural network to reveal similarities between the input vectors and producing output vectors, and by summarizing the output vectors, wherein the deep learning is machine learning that models high-level abstractions in the input vectors, and the summarizing comprises:
    - performing hierarchical clustering on weight vectors produced by the neural network;
    - associating the clustered weight vectors with corresponding details about the network flow information; and
    - determining the dependencies based on the patterns; and
- outputting results of the identifying the functional dependencies, the results comprising functional dependencies between first and second network assets, wherein the results are useable for assessing damage to a network, business planning, crisis management or triage, planning extensions to the network, disaster recovery planning, or other evaluation of current or planned network behavior.

2. The one or more non-transitory computer-readable media of claim 1, wherein the network flow information is packet flow information comprising an n-tuple per network flow, the network flow being an aggregation of packets that have common addressing attributes.

3. The one or more non-transitory computer-readable media of claim 1, wherein the network flow information is received from multiple network probes situated in a network.

4. The one or more non-transitory computer-readable media of claim 1, further storing computer-executable instructions for causing the computing system, when programmed thereby, to perform:
- repeating the receiving, the identifying, and the outputting, so as to update an assessment of the dependencies between the multiple network assets on a near real-time basis.

5. The one or more non-transitory computer-readable media of claim 1, wherein the dependencies are identified as recurrent temporal sequence-based patterns, and wherein each of the recurrent temporal sequence-based patterns is a randomly-initiated, repeating sequence of time-dependent elements.

6. The one or more non-transitory computer-readable media of claim 1, wherein the pre-processing further includes one or more of:
- selectively converting unidirectional flow information to bidirectional flow information;
- windowing the network flow information using a time interval;
- categorizing network flows based on attributes of the network flow information;
- identifying the instances of temporally proximate co-occurrences within the network flow information based on an ensemble approach; and
- checking that categorization of the network flow information is stable over a period of time.

7. The one or more non-transitory computer-readable media of claim 6, wherein the categorizing assigns one of multiple categories as a function of attributes of a record of the network flow information, and wherein the attributes include one or more of source address, source port, destination address, destination port and protocol.

8. The one or more non-transitory computer-readable media of claim 6, wherein the ensemble approach uses one or more of mutual information analysis, co-occurrence matrices followed by signal strength enhancement, clustering, auto-correlation/cross-correlation analysis, probability analysis, information-theoretic analysis, and cepstrum analysis.

9. The one or more non-transitory computer-readable media of claim 6, wherein the instances are organized as a set of pairs of categorized records of the network flow information.

10. The one or more non-transitory computer-readable media of claim 1, wherein the encoding indicates, for a given one of multiple possible higher-order combinations in a time interval, one of:
- presence or absence of the given higher-order combination in the time interval; and
- count of the given higher-order combination in the time interval.

11. The one or more non-transitory computer-readable media of claim 1, wherein the deep learning uses modeling architectures with non-linear transformations.

12. The one or more non-transitory computer-readable media of claim 1, wherein the applying the neural network includes training a self-organizing map using the input vectors, and wherein the training the self-organizing map produces the weight vectors for nodes of the self-organizing map, the weight vectors indicating the similarities between the input vectors.

13. The one or more non-transitory computer-readable media of claim 1, wherein each of the input vectors includes, for a given time period, information indicating extent of co-occurrence of activity between network assets in various combinations, selected from among the multiple network assets, during the given time period, and wherein the summarizing makes the identification of the dependencies more robust over time.

14. In a computing system, a method comprising:
- receiving, at the computing system, network flow information summarizing packet flow between pairs of network assets over one or more time periods;

with the computing system, identifying dependencies between multiple network assets based on evaluation of the network flow information, wherein the evaluation includes:
- pre-processing the network flow information to produce input vectors;
- using deep learning to extract patterns in the input vectors, at least in part by applying a neural network to reveal similarities between the input vectors and producing output vectors, and by summarizing the output vectors, wherein the deep learning is machine learning that models high-level abstractions in the input vectors and the summarizing comprises:
  - performing hierarchical clustering on weight vectors produced by the neural network;
  - associating the clustered weight vector with corresponding details about the network flow information; and
- determining the dependencies based on the patterns; and with the computing system, outputting results of the identifying the dependencies, the results comprising identifications of dependencies between network assets.

15. The method of claim 14, wherein the pre-processing includes one or more of:
- selectively converting unidirectional flow information to bidirectional flow information;
- windowing the network flow information using a time interval;
- categorizing network flows based on attributes of the network flow information;
- identifying instances of temporally proximate co-occurrences within the network flow information based on an ensemble approach; and
- checking that categorization of the network flow information is stable over a period of time.

16. A computing system comprising a processor and memory, wherein the memory comprises computer-executable instructions for implementing a network analysis tool, the computer-executable instructions specifying operations comprising:
- receiving network flow information summarizing packet flow between pairs of network assets over one or more time periods;
- pre-processing the network flow information to produce input vectors, the pre-processing comprising:
  - combining instances of temporally proximate co-occurrences within the network flow information into higher-order combinations;
  - encoding the higher-order combinations as the input vectors; and
  - annotating the input vectors with details about the network flow information; and
- extracting patterns in the input vectors using deep learning, wherein the deep learning is machine learning that models high-level abstractions in the input vectors;
- determining, based on the patterns, dependencies between multiple network assets; and
- outputting data setting forth dependencies between network assets.

17. One or more non-transitory computer-readable media storing computer-executable instructions for causing a computing system, when programmed thereby, to perform:
- receiving network flow information summarizing packet flow between pairs of network assets over one or more time periods;
- identifying dependencies between multiple network assets based on evaluation of the network flow information, wherein the dependencies are identified as recurrent temporal sequence-based patterns, each of the recurrent temporal sequence-based patterns being a randomly-initiated, repeating sequence of time-dependent elements, and the evaluation includes:
  - pre-processing the network flow information to produce input vectors;
  - using deep learning to extract patterns in the input vectors, wherein the deep learning is machine learning that models high-level abstractions in the input vectors; and
  - determining the dependencies based on the patterns; and
- outputting results of identifying the dependencies, the results comprising identifiers of dependencies between network assets.

18. One or more non-transitory computer-readable media storing computer-executable instructions for causing a computing system, when programmed thereby, to perform:
- receiving network flow information summarizing packet flow between pairs of network assets over one or more time periods;
- identifying dependencies between multiple network assets based on evaluation of the network flow information, wherein the evaluation includes:
  - pre-processing the network flow information to produce input vectors, wherein each of the input vectors includes, for a given time period, information indicating an extent of co-occurrence of activity between network assets in various combinations, selected from among the multiple network asserts, during the given time period;
  - using deep learning to extract patterns in the input vectors, wherein the deep learning is machine learning that models high-level abstractions in the input vectors and comprises:
    - applying a neural network to reveal similarities between the input vectors, wherein the applying the neural network produces output vectors;
    - summarizing the output vectors, the summarizing making the identification of the dependencies more robust over time; and
    - determining the dependencies based on the patterns; and
- outputting results of identifying the dependencies, the results comprising identifiers of dependencies between network assets.

* * * * *